(12) United States Patent
Wesnigk

(10) Patent No.: US 8,104,370 B2
(45) Date of Patent: Jan. 31, 2012

(54) CARRIER PLATES AND A METHOD FOR THEIR PRODUCTION

(75) Inventor: Tobias Wesnigk, Odernheim (DE)

(73) Assignee: Johann Hay GmbH & Co. KG Automobiltecnik, Sobernheim (DE)

( * ) Notice: Subject to any disclaimer, the term of this patent is extended or adjusted under 35 U.S.C. 154(b) by 460 days.

(21) Appl. No.: 12/285,681

(22) Filed: Oct. 10, 2008

(65) Prior Publication Data

US 2010/0093451 A1    Apr. 15, 2010

(51) Int. Cl.
*F16H 55/14*    (2006.01)

(52) U.S. Cl. .......................................... 74/445; 464/98

(58) Field of Classification Search .................... 464/98, 464/99, 66.1–67.1; 74/445, 446, 449, 431–433.5; 219/121.64; 474/902, 903; 29/893.2, DIG. 13, 29/DIG. 48
See application file for complete search history.

(56) References Cited

U.S. PATENT DOCUMENTS

| | | | |
|---|---|---|---|
| 1,407,704 A * | 2/1922 | Morris ......................... | 29/893.2 |
| 2,516,365 A * | 7/1950 | Carraher ....................... | 74/445 |
| 4,991,993 A * | 2/1991 | Watlington et al. ........... | 474/902 |
| 5,211,327 A * | 5/1993 | Clarke et al. .......... | 219/121.64 X |
| 5,293,977 A * | 3/1994 | Friedmann ............... | 464/68.4 X |
| 5,452,622 A * | 9/1995 | Fenelon | |
| 6,014,912 A * | 1/2000 | Carlson ........................ | 464/68.1 |

FOREIGN PATENT DOCUMENTS

| | | |
|---|---|---|
| DE | 197 55 168 A1 | 6/1999 |
| DE | 100 15 206 A1 | 3/2000 |
| DE | 199 05 713 C1 | 8/2000 |
| DE | 103 01 771 A1 | 7/2004 |

OTHER PUBLICATIONS

Farson et al, "Taking Advantage of Laser Welding," thefabricator.com, Fabricators & Manufacturers Association, Intl., May 15, 2001.*
Search Report dated Jun. 20, 2008 issued in corresponding European application.

* cited by examiner

*Primary Examiner* — Gregory Binda
(74) *Attorney, Agent, or Firm* — Finnegan, Henderson, Farabow, Garrett & Dunner, L.L.P.

(57) ABSTRACT

A carrier plate and related method for an automatic transmission is provided, whereby the carrier plate has a ring gear (1) connected to a driving plate (2) by means of welding and has at least one thickening plate (4, 5) connected to the driving plate (2) by means of welding. Preferably the ring gear (1) is connected to the driving plate (2) means of beam welding using auxiliary material.

19 Claims, 1 Drawing Sheet

CARRIER PLATES AND A METHOD FOR THEIR PRODUCTION

BACKGROUND

1. Technical Field

The present invention relates to a carrier plate such as is predominantly used in automobiles with automatic transmissions, as well as to a method for the production of such plates.

2. Description of The Related Art

A generic carrier plate at any rate comprises a ring gear as well as a driving plate, which is arranged on the inner circumference surface of the ring gear. Customary carrier plates furthermore have one or two thickening plates that are arranged as a covering interlayer or reinforcing plate on opposite sides of the driving plate and that are attached to this driving plate in a concentric manner. The corresponding reinforcing and/or distance plates are restricted, in the radial direction, to the central area of the driving plate and concentrically surround a centre bore hole in the carrier plates, said bore hole forming a hub for the crankshaft.

A corresponding carrier plate is described, for example, in DE 199 05 713 C1. An alternative example is disclosed in DE 32 36 321 D2.

The carrier plate serves to transmit the moment between the crankshaft of the combustion engine and the torque converter in the case of motor vehicles with automatic transmissions. The ring gear mounted on the driving plate increases the torque of the starter motor and transfers this torque to the crankshaft while the engine is being started.

The connection between the ring gear and the driving plate can be brought about by means of various methods. For example, the parts can be welded together (cf. DE 199 05 713 C1). The at least one thickening plate provided in a central part of the driving plate stiffens, on the one hand, the driving plate, so that this plate can better absorb a flexural type stress. The at least one thickening plate furthermore reinforces bore holes provided concentrically to the hub, whereby these bore holes are also provided on the driving plate, and whereby the carrier plate can be screwed to the crankshaft through these bore holes. The axial position of the carrier plate between the crankshaft and the torque converter is furthermore determined by the at least one thickening plate. The at least one thickening plate does not transfer any relevant torques, so that there are various possibilities for connecting the at least one thickening plate to the driving plate. For example, it is known to weld the thickening plate to the driving plate (DE 199 05 713). The at least one thickening plate can just as well be connected to the driving plate by means of clinching, rivets or even gluing. It is only necessary for the connection to be provided in such a way that the carrier plate is attached to the crankshaft in the area of the gearbox by means of screwing until the time of the final assembly. After that time the crankshaft screws take over the attachment of the at least one thickening plate.

DE 199 05 713 C1 describes a method in which all components of the carrier plate are connected to one another in a metal inert gas welding (MIG) or metal active gas welding (MAG) procedure. The corresponding MIG or MAG welding methods lead, however, to a high level of heat being introduced into the workpiece, which can warp as a result. There is also the problem that weld spatter can blemish the surface of the workpiece. The MIG or MAG welding procedure correspondingly makes touch up steps necessary. It is furthermore necessary to specially prepare that at least one thickening plate for the weld seam.

The basis of the following invention is formed by the problem of specifying a carrier plate and a method for its production that lead to an improvement in the quality and profitability of the production of the carrier plate.

SUMMARY OF THE INVENTION

With regard to the product, the present invention proposes a carrier plate that differs from the carrier plate forming the generic part in that the ring gear is joined to the driving plate on the one hand and the driving plate is joined to the at least one thickening plate on the other hand by means of beam welding. Particularly preferred for use here as beam welding is laser beam welding, and preferably with the use of auxiliary material.

With beam welding, particularly laser beam welding, the effect of deep penetration welding is used in order to form a narrow and deep weld seam that has an extremely small influence on the surrounding material of the workpiece and that introduces only a very small amount of heat into the seam. From this result the thermal shape distortions, which are low for the beam welding is used. There is no need for touching up the joined workpiece afterwards. The seam at the ring gear and the driving plate is prepared in such a way that the seam can be executed in, for example, a square butt joint (FIG. 3A) or in a lap joint (FIG. 3). The same applies correspondingly to the preparation of the seam between the at least one thickening plate and the driving plate.

Preferably the at least one thickening plate is connected to the driving plate via tack welding points, however, which makes any seam preparation dispensable. In this case, the deep penetration effect possible with beam welding is again used, in order, for example, to produce weld points that penetrate the at least one thickening plate, preferably the plates that are arranged on the two sides of the driving plate, and the driving plate, so that it connects all parts without any thermal distortions.

The weld seam formed between the driving plate and the ring gear by beam welding can be formed to run around the circumference. Alternatively, the weld seam can also be formed by linear sections that are separated from one another and that are to be provided across the inner circumference of the ring gear.

According to a further preferred development of the present invention and depending on the material pairing that is formed by the ring gear on the one hand and by the driving plate on the other, the weld seam can be produced while using an auxiliary wire 14 (See FIG. 1A).

According to a further preferred development, the driving plate in any case is provided in a known way in the radial inside area, preferably between two thickening plates. These two thickening plates and the driving plate are connected to one another by means of at least one weld point that penetrates the carrier plate and the driving plate. Preferably a plurality of such weld points is provided distributed across the circumference.

The ring gear can furthermore be adapted in a special way to the selected welding method. For example, the ring gear can have a contact shoulder on its inner circumference surface, whereby the carrier plate lies on one side of this contact shoulder and so is axially fixed in place on one side with reference to the ring gear. The driving plate placed into the ring gear in this manner can be pressed axially against the contact shoulder from the opposite side when the driving plate and the ring gear are being joined. In the direction of pressing, there is then pressurisation with the beam for beam welding, so that the weld seam is formed opposite the contact shoulder. The effect of the deep penetration welding here is preferably used in order to form the weld seam in any case up to the contact shoulder. The weld seam correspondingly extends essentially across the entire thickness of the driving plate.

According to a further preferred development of the present invention, a ring shoulder is formed on the inner circumference surface of the ring gear on the side opposite the contact shoulder, at roughly the same level as the carrier plate. The ring gear's inner circumference surface that leads to the ring shoulder can be slightly conically sloped outward for easier insertion of the driving plate during the production of the carrier plate, so that the driving plate inserted into the ring gear is necessarily concentrically introduced. Furthermore, pinpoint positioning of the welding beam into the gap between the outer circumference surface of the driving plate and the inner circumference of the ring gear is facilitated by the ring shoulder, without there being any danger that those parts of the ring gear that lie axially outside, meaning upstream in the direction of the impacting welding beam, become fused. Alternatively or additionally, the welding beam can be directed at the joining position so that it tilts outward relative to the axis of the carrier plate.

When forming the weld seam between the driving plate and the ring gear in partial segments 10' in the circumferential direction as shown in FIG. 1A, the components mentioned, namely the "ring shoulder" and the "contact shoulder", can also be shaped in sections 10 in the circumferential direction. In principle, however, due to manufacturing considerations, a rotationally symmetrical development of the ring shoulder and the contact shoulder is to be preferred.

With regard to the solution of the problem with respect to the method, the present invention specifies a method for the production of a carrier plate for an automatic transmission, whereby in this method, the ring gear and also at least one thickening plate are connected to a driving plate by means of welding, and whereby this method differs from the state of the art as given in DE 199 05 713 in that the ring gear is connected to the driving plate on the one hand and that the driving plate is connected to the at least one thickening plate on the other hand by means of beam welding, particularly by means of laser beam welding.

According to a preferred further development, the method calls for the welded joint between the ring gear and the driving plate to be formed using an auxiliary material. In this way, it is possible to increase the strength of the weld seam, particularly in the case of material pairings with various materials.

It is furthermore preferred in the case of the method to arrange the driving plate between two thickening plates. These components are subsequently connected to one another by means of deep penetration beam welding, preferably by means of deep penetration laser beam welding, namely by means of at least one tack point executed in a lap joint.

During the production of the carrier plate, the driving plate, the ring gear and the at least one thickening plate are preferably inserted into a holder that holds all components. The components are centered and fixed in place, preferably by means of clamping, in this holder, and then welded together by means of deep penetration beam welding. At the same time, the holder can be driven rotationally, which is suggested in particular when a weld seam is to be formed, either along the entire circumference or, in any case, in sections 10' along the circumference, between the outer circumference surface of the driving plate and the inner circumference of the ring gear as is shown in FIG. 1A. It has, however, also been shown that during the welding of the at least one thickening plate to the driving plate, there should be a slight relative movement, which is preferably a rotational relative movement, between the laser and the workpiece if increased durability of the weld seam is to be achieved. In the case of this execution of the method, a weld point results that has a certain, albeit short, length. This length, however, is normally less than the welding depth, so that calling the welded joint a "weld point" is still justified.

The present invention is explained in more detail in the following using an embodiment in association with the drawing. Shown are:

BRIEF DESRIPTION OF THE DRAWINGS

FIG. 1A is a top view of a carrier plate using an alternative embodiment of the present invention;

FIG. 3A is an enlarged sectional representation of an alternative joining point between the ring gear at the driving plate.

DESCRIPTION OF THE EMBODIMENTS

Figure 1:
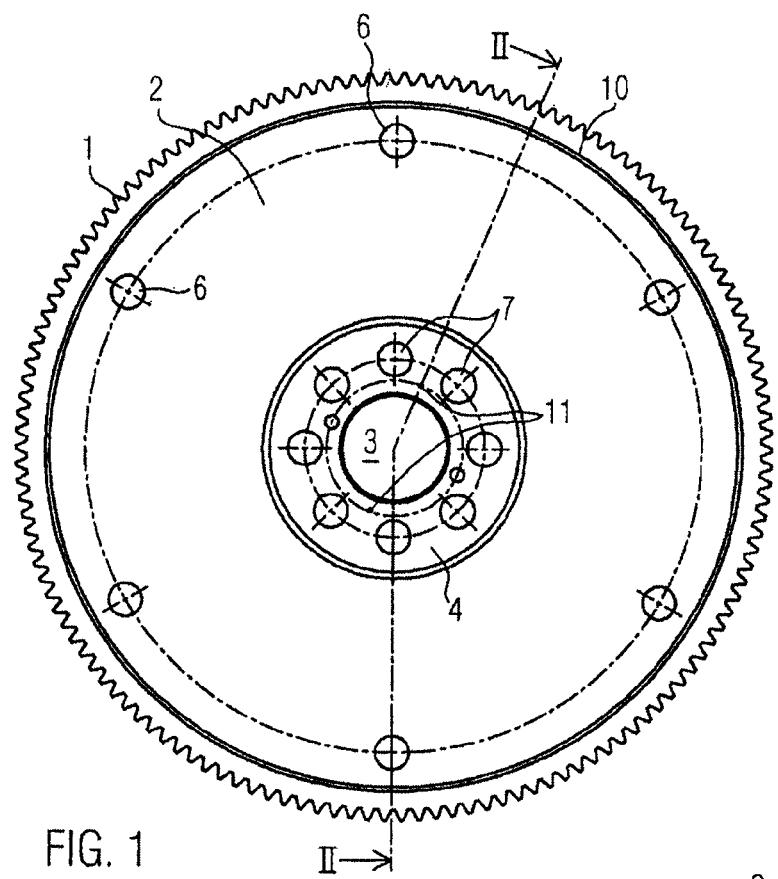
FIG. 1 is a top view of a carrier plate using an embodiment of the present invention.
Figure 2:
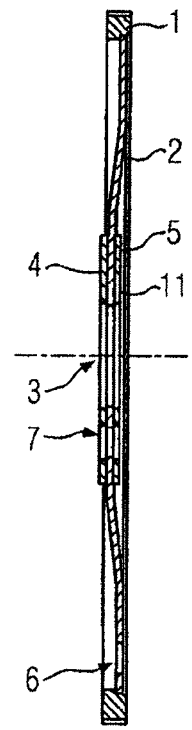
FIG. 2 is a sectional view along the line II-II shown in the representation according to FIG. 1.

The embodiment shown in the drawing has a ring gear 1 and a driving plate 2. The driving plate 2 forms a hub 3, which is reinforced by thickening plates 4, 5 arranged on either side.

Adjacent to the ring gear 1, the driving plate 2 has bore holes 6 distributed along the circumference for the purpose of screwing the plate to a torque converter. Additional bore holes 7 are provided concentrically around the hub for the purpose of screwing the carrier plate to the crankshaft. The additional bore holes 7 are also arranged distributed along the circumference.

Figure 3:
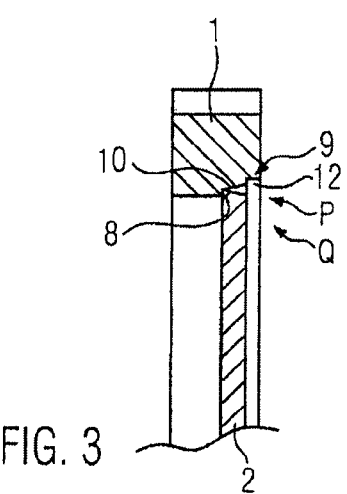
FIG. 3 is an enlarged sectional representation of the joining point between the ring gear and the driving plate.
Figure 4:
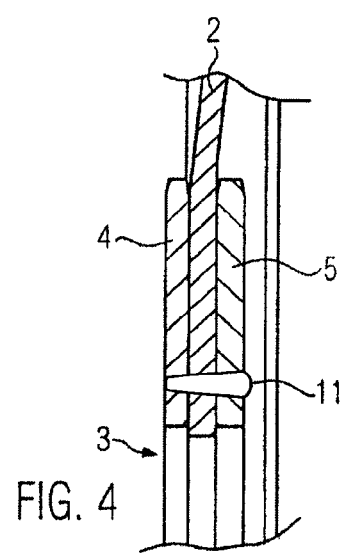
FIG. 4 is an enlarged sectional representation of the joining point between the driving plate and the two thickening plates in the area of the hub of the carrier plate.

The inner circumference surface of the ring gear 1 is contoured in a special manner so that the ring gear 1 can be connected to the driving plate 2 (cf. FIG. 3). On its inner circumference surface, the ring gear 1 forms a contact shoulder 8 that is located in a roughly axial direction in the middle of the ring gear 1. The contact shoulder 8 extends from an inner radius of the ring gear 1, which is smaller than the outer radius of the driving plate 2, up to a middle inner radius that is larger than the outer radius of the driving plate 2. The contact surface formed by the contact shoulder 8 extends radially with respect to the ring gear 1. A further shoulder is formed as a ring shoulder 9, which is spaced at some axial distance. This ring shoulder 9 is axially distanced from the contact shoulder 8, whereby this distance roughly corresponds to the thickness of the driving plate 2. The driving plate 2 that lies on the contact shoulder 8 correspondingly lies so that its other surface is roughly at the same level as the ring shoulder 9. A partial inner circumference surface 12 that goes out from the face side of the ring gear 1 and that extends to the ring shoulder 9 has an inner radius that is greater than the outer radius of the contact shoulder 8. The result is then a tiered progression from the smallest inner radius of the ring gear 1 to the other face side of the ring gear 1, with the contact shoulder 8 as the first tier and the ring shoulder 9 as the second tier.

As a result of this tiered progression, the surface formed by the ring gear 1 adjacent to the driving plate 2 is roughly at the same level as the driving plate 2. A laser beam that hits the phase interface between the ring gear 1 and the driving plate 2 from the welding direction (shown by the arrow P) accordingly melts two surface segments, both at the same level, of the components to be joined. The laser beam can hit in the axial direction relative to the ring gear 1, i.e., at a right angle to the surfaces to be fused. It can, however, also be arranged with a slight slant, particularly tilted toward the centre longitudinal axis of the ring gear 1, as is indicated in FIG. 3 by the arrow Q.

As the sectional view shown in FIG. 3 indicates, the effect of the deep penetration welding produces a weld seam 10 that extends first from the surface acted upon by the beam and then up to the contact shoulder 8. There results a deep connection between the ring gear 1 and the carrier plate 2, without, however, there being the disadvantage of a thermally induced distortion of the two components. As can be seen in FIG. 1, the weld seam 10 runs between the driving plate 2 and the ring gear 1 in the circumferential direction at the phase interface.

The two thickening plates 4, 5 are connected to each other by means of two weld points 11 that lie roughly diametrically opposite each other with reference to the axis of the ring gear 1, whereby these two weld points 11 are formed as a tacked seam in the lap joint. The respective weld points 11 penetrate through the two thickening plates 4, 5, as well as through the driving plate 2. The weld points 11 are formed with the same welding direction as the ring-shaped weld seam 10, routinely by the same laser beam.

In the production of the embodiment shown, normally first the ring gear 1 and the lower thickening plate 4 are placed into a holder. After this, the driving plate 2 is inserted into the ring gear 1 and positioned against the contact shoulder 8. Finally, the other upper thickening plate 5 is placed on to the driving plate 2. The thickening plates 4, 5 are arranged concentrically with the hub 3. The adjusted arrangement of all components relative to one another is then fixed in place.

Now the two weld points 11 are produced, preferably by means of a laser. After this, it is possible to remove the holder that is fixing the thickening plates 4, 5 in place. The holder is preferably arranged in such a manner that it can be rotated, so that in the subsequent joining of the ring gear 1 and the driving plate 2, the ring gear 1 can be rotated together with the driving plate 2 while the laser remains stationary. As a result, the ring-shaped weld seam 10 is formed between the outer circumference surface of the driving plate 2 and the ring gear 1.

In an alternate approach, the ring-shaped weld seam 10 is performed between the outer circumference surface of the drive plate 2 and the ring gear 1 as the first weld seam. After this, the weld seam may be inspected and approved. After this, the thickening plates 4, 5 may be applied to the driving plate and attached thereto by means of the two weld points 11. Accordingly, in the event the weld seam 10 does not pass quality control, the preassembled thickening plates 4, 5 are not trashed.

The component produced in this manner can be produced economically and yet without thermal distortion. The processing steps are optimised. There is furthermore no risk that welding pits will impair the carrier plate.

LIST OF REFERENCE NUMBERS

1 Ring gear
2 Driving plate
3 Hub
4 Thickening plate
5 Thickening plate
6 Bore hole for screwing on the converter
7 Bore hole for screwing on the crankshaft
8 Contact shoulder
9 Ring shoulder
10 Weld seam
11 Weld point
12 Partial inner circumference surface
P, Q Welding direction

The invention claimed is:

1. A carrier plate of an automatic motor vehicle transmission with:
a ring gear (1) connected to a
driving plate (2) by means of welding and wherein
two thickening plates (4, 5) hold the driving plate (2) between them and are connected to each other by means of at least one weld point (11) that penetrates the thickening plates (4, 5) and the driving plate (2) and, wherein the ring gear (1) is connected to the driving plate (2) by a laser beam weld seam (10) formed between the ring gear (1) and the drive plate (2) by use of an auxiliary material.

2. A carrier plate according to claim 1 the weld seam (10) is provided on the outer circumference of the driving plate (2).

3. A carrier plate according to claim 2 wherein the weld seam is formed continuously along the circumference.

4. A carrier plate according to claim 1 wherein the weld point (11) is formed as part of a lap joint.

5. A carrier plate according to claim 1 wherein the driving plate (2) lies on a contact shoulder (8) formed on the inner circumference surface of the ring gear (1) and the weld seam (10) is formed opposite the contact shoulder (8).

6. A carrier plate according to claim 5 wherein the weld seam (10) extends up to the contact shoulder (8).

7. A carrier plate according to claim 5 wherein a ring shoulder (9), spaced at a distance from the contact shoulder (8), is formed on the inner circumference surface of the ring gear (1) and this ring shoulder (9) is roughly at the same level as the surface of the driving plate (2).

8. A carrier plate according to claim 7 wherein the weld seam (10) is formed as a lap joint between the ring gear (1) and the driving plate (2).

9. A carrier plate with
a ring gear (1) connected to
a driving plate (2) by means of welding and wherein
two thickening plates (4, 5) hold the driving plate (2) between them and are connected to each other by means of at least one weld point (11) that penetrates the thickening plates (4, 5) and the driving plate (2).

10. A carrier plate according to claim 9 wherein the weld point (11) is formed as part of a lap joint.

11. A carrier plate according to claim 9, wherein the ring gear (1) and the driving plate (2) are connected to one another by means of a weld seam (10) provided on the outer circumference of the driving plate (2).

12. A carrier plate according to claim 11, wherein the weld seam is formed continuously along the circumference.

13. A carrier plate according to claim 11, wherein the weld seam is formed in sections separated from one another along the circumference.

14. A carrier plate according to claim 11, wherein the weld seam (10) is formed between the ring gear (1) and the driving plate (2) by means of the use of an auxiliary material.

15. A carrier plate according to claim 9, wherein the driving plate (2) lies on a contact shoulder (8) formed on the inner circumference surface of the ring gear (1) and that the weld seam (10) is formed opposite the contact shoulder (8).

16. A carrier plate according to claim 15, wherein the weld seam (10) extends up to the contact shoulder (8).

17. A carrier plate according to claim 16, wherein a ring shoulder (9), spaced at a distance from the contact shoulder (8), is formed on the inner circumference surface of the ring gear (1) and this ring shoulder (9) is roughly at the same level as the surface of the driving plate (2).

18. A carrier plate according to claim 17, wherein the weld seam (10) is formed as a lap joint between the ring gear (1) and the driving plate (2).

19. A carrier plate according to claim 17, wherein the weld seam (10) is formed as a butt joint between the ring gear (1) and the driving plate (2).

* * * * *

UNITED STATES PATENT AND TRADEMARK OFFICE
CERTIFICATE OF CORRECTION

PATENT NO. : 8,104,370 B2
APPLICATION NO. : 12/285681
DATED : January 31, 2012
INVENTOR(S) : Tobias Wesnigk It is certified that error appears in the above-identified patent and that said Letters Patent is hereby corrected as shown below:

In the Claims:

Claim 2, column 6, line 12, "A carrier plate according to claim 1 the weld seam (10)" should read --A carrier plate according to claim 1, wherein the weld seam (10)--.

Signed and Sealed this
Fourteenth Day of May, 2013

Teresa Stanek Rea
*Acting Director of the United States Patent and Trademark Office*